US012630469B2

(12) United States Patent
Ortner et al.

(10) Patent No.: US 12,630,469 B2
(45) Date of Patent: May 19, 2026

(54) METHOD FOR PRODUCING STRUCTURED GLASS ARTICLES BY ALKALINE ETCHING

(71) Applicant: SCHOTT AG, Mainz (DE)

(72) Inventors: Andreas Ortner, Gau-Algesheim (DE); Fabian Wagner, Mainz (DE); Markus Heiss-Chouquet, Bischofsheim (DE); Michael Drisch, Mainz (DE); Vanessa Glässer, Mainz (DE); Annika Hörberg, Mainz (DE); Marisa Boles-Rehbogen, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 18/334,604

(22) Filed: Jun. 14, 2023

(65) Prior Publication Data

US 2023/0406758 A1     Dec. 21, 2023

Related U.S. Application Data

(63) Continuation of application No. PCT/EP2021/084785, filed on Dec. 8, 2021.

(30) Foreign Application Priority Data

Dec. 14, 2020     (DE) ..................... 10 2020 133 278.5

(51) Int. Cl.
*C03C 15/00*     (2006.01)
*C03C 23/00*     (2006.01)
(52) U.S. Cl.
CPC .......... *C03C 15/00* (2013.01); *C03C 23/0025* (2013.01)

(58) Field of Classification Search
None
See application file for complete search history.

(56) References Cited

U.S. PATENT DOCUMENTS

| | | | |
|---|---|---|---|
| 2,428,187 A | 9/1947 | Wegst | |
| 3,586,633 A | 6/1971 | Schlussler | |
| 2002/0058463 A1 | 5/2002 | Kurachi | |
| 2002/0061603 A1* | 5/2002 | Eto ...................... | G11B 5/8404 |
| 2009/0001315 A1 | 1/2009 | Ishikawa | |
| 2010/0246016 A1* | 9/2010 | Carlson ................... | C09G 1/00 |
| | | | 359/599 |
| 2012/0009396 A1 | 1/2012 | Sikka | |
| 2012/0052302 A1* | 3/2012 | Matusick ................ | C03C 17/32 |
| | | | 216/97 |
| 2013/0061636 A1* | 3/2013 | Imai ...................... | C03C 21/002 |
| | | | 65/30.14 |

(Continued)

FOREIGN PATENT DOCUMENTS

| | | |
|---|---|---|
| CN | 101507964 A | 8/2009 |
| CN | 108033685 A | 5/2018 |

(Continued)

*Primary Examiner* — Shamim Ahmed
(74) *Attorney, Agent, or Firm* — Ruggiero McAllister & McMahon LLC

(57)     ABSTRACT

A method for producing structured glass articles is provided by removing glass material from a glass element. The method includes the step of etching the glass element to remove the glass material from using an etching medium. The etching medium has a basic aqueous etching solution with a pH of more than 12 and a complexing agent. The complexing agent complexes a leached constituent of the glass element.

15 Claims, 7 Drawing Sheets

(56)  References Cited

U.S. PATENT DOCUMENTS

| | | | | |
|---|---|---|---|---|
| 2014/0146839 A1* | 5/2014 | George | ..................... | H01S 3/16 |
| | | | | 372/40 |
| 2015/0048053 A1 | 2/2015 | Cordonier | | |
| 2018/0215647 A1* | 8/2018 | Ortner | ................. | C03B 33/0222 |
| 2020/0156990 A1* | 5/2020 | Sakade | .................. | C09K 13/00 |
| 2020/0361811 A1* | 11/2020 | Hevner | .............. | C04B 41/5353 |
| 2022/0112123 A1* | 4/2022 | Ortner | ..................... | C03C 3/097 |

FOREIGN PATENT DOCUMENTS

| | | | |
|---|---|---|---|
| DE | 102013103370 | | 10/2014 |
| EP | 3613710 | A1 | 2/2020 |
| GB | 2210382 | B | 1/1992 |
| JP | H01163300 | A | 6/1989 |
| JP | 2002160943 | A | 6/2002 |
| JP | 2014222330 | | 11/2014 |
| JP | 2018166143 | | 10/2018 |
| KR | 20200036810 | A | 4/2020 |
| WO | 2020097689 | A1 | 5/2020 |

* cited by examiner

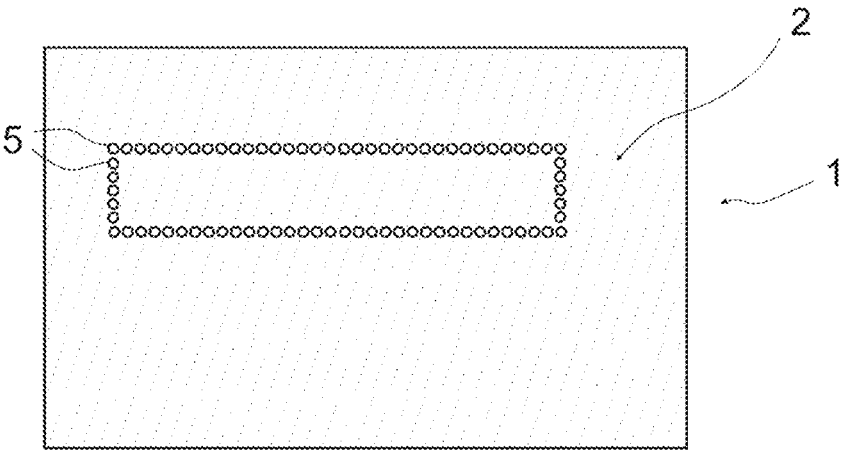
FIG. 3
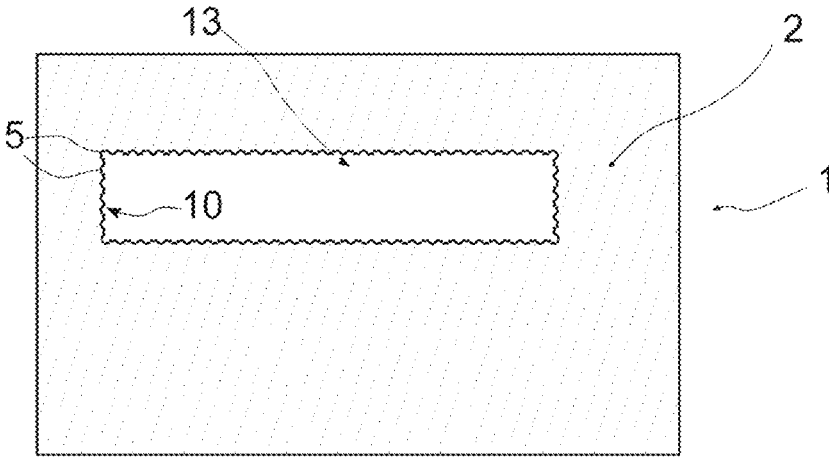
FIG. 4
FIG. 5

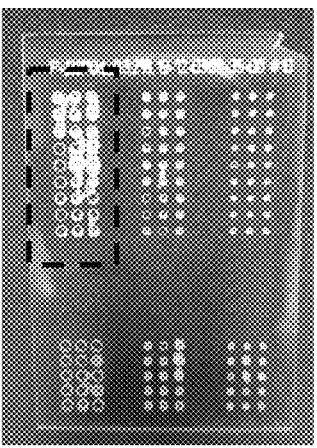
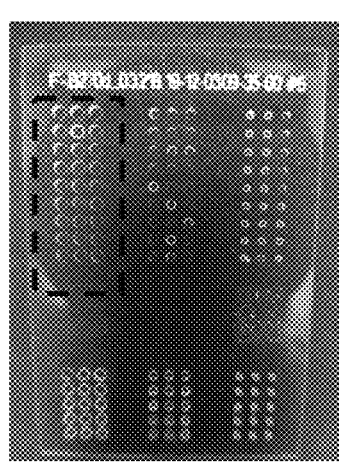
FIG. 10a                    FIG. 10b

METHOD FOR PRODUCING STRUCTURED GLASS ARTICLES BY ALKALINE ETCHING

CROSS REFERENCE TO RELATED APPLICATIONS

This application is a continuation of International application PCT/EP2021/084785 filed Dec. 8, 2021, which claims benefit under 35 USC § 119 of German application 10 2020 133 278.5 filed Dec. 14, 2020, the entire contents of all of which are incorporated herein by reference.

BACKGROUND

1. Field of the Invention

In general the invention relates to a method for producing glass articles, more particularly glass articles having structured glass surfaces through etching processes. In particular the invention relates to a method for producing structured glass articles by etching glass in aqueous alkaline solutions.

There are many areas in which precise working is relevant, in the form, for example, of a structuring of transparent, opaque or nontranspicuous glass or glass-ceramic elements. Numerous applications require exact structures in the size range of a few micrometers. Depending on the particular application, the structures required may be cut-outs, indentations, channels with various cross-sectional shapes, or free forms. There is therefore a need for structuring methods which permit high flexibility in terms of the shape while at the same time exhibiting only small deviations with respect to the measurements and nature of the structures obtained.

Various methods for glass structuring are known in this context from the prior art. For instance, DE 10 2013 103 370 A1 describes a method for micorperforating glass substrates wherein the structures desired are obtained through a combination of laser irradiation and a subsequent etching process. In this case, in the regions previously subjected to laser treatment, the material is removed by an etching process.

There are also structuring methods known where material is ablated in an etching process in acidic aqueous solution. A disadvantage with these methods, however, is that because of the small dimensions of the structures being generated, there is only little exchange of the etching solution, or none. This leads to a local saturation of the etching solution with the constituents that have already been leached out, and leads to an imminent standstill or at least to a considerable deceleration of the etching process within the structures being generated. Since this effect does not occur when etching the near-surface regions, an etching cone is formed, i.e., a conical widening of the structure being generated. The etching rate rises again in the course of the process, as soon as the internal volume increases as a result and hence solution exchange of the etching solution becomes enabled. As a consequence of the nonuniform etching rate during the process, small cut-end angles are obtained. Furthermore, certain types of glass are not suitable for etching in acidic media.

DE 10 2013 103 370 A1 describes an etching process for glass structuring in a basic etching medium. This process too, however, has only very low etching rates of less than 8 µm per hour. Here as well, furthermore, there is the above-described problem of a local saturation of the etching solution within the structures. As a result of this etching process, therefore, the filaments initially generated are widened into channels, and the channel walls are deformed.

SUMMARY

It is therefore an object of the invention to provide a method for producing structured glass articles, or for glass working, that does not have the disadvantages described above and that enables the generation of structures with high shape fidelity in conjunction with a high etching rate for a multiplicity of different glass compositions. A further object of the invention is that of providing an etching solution for glass structuring with high shape fidelity and a high etching rate.

In the method of the invention, a glass element is provided and glass material is removed locally or in selected regions by an etching process. For this, the glass element is contacted, at least in the regions to be structured, with an etching solution. The method preferably comprises a structuring process.

The etching solution is an aqueous basic solution and has a pH>12. The etching solution also comprises at least one complexing agent, the complexing agent forming a complex in solution with at least one of the leached glass constituents. Formation of a complex is understood here to be, in particular, the formation of one or more coordinative bonds between the corresponding leached constituent and at least one complexing agent. The complexing agent here constitutes the ligand or ligands with which the corresponding glass constituent leached from the glass forms the complex. The complex formed here may comprise one or more ligands. Multicentered complexes are also possible. In particular, the complexing agent comprises a Lewis base. A mixture of two or more different complexing agents in the etching solution is also possible.

The term "etching solution" refers in particular to the solution which is provided for the method. The solution which already comprises leached glass constituents is referred to in the sense of the invention as "reaction solution". Etching solution and reaction solution here may differ in terms of the concentration of individual constituents therein.

As a result of the high pH of the etching solution, the $SiO_2$ matrix is dissolved at the exposed regions of the glass element, forming silicates, and hence also the remaining glass constituents are leached out of the corresponding region. According to one preferred embodiment of the invention, the etching solution has a pH>13, more preferably a pH of at least 14. According to one preferred embodiment, the etching solution has a hydroxide ion concentration of at least 1 mol/l, preferably at least 2 mol/l, and particularly preferably of at least 3 mol/l. According to one embodiment of the invention, the hydroxide ion concentration is at least 6 mol/l. The etching solution comprises preferably potassium hydroxide (KOH) and/or sodium hydroxide (NaOH).

With the method of the invention, the complexing of leached constituents does not result in local inhibition of the etching procedure. Instead, even within the structures being generated, there is a self-stabilizing or even self-reinforcing effect in relation to the etching rate. The etching rate is preferably at least 10 µm/h or even at least 20 µm/h.

This is achieved on the one hand by the addition of a complexing agent to the etching solution. As a result, the corresponding complexed glass constituent in the reaction solution is present at least partly in the form of a dissolved complex. The reaction solution refers more particularly to the solution which forms by the process of leaching on the glass element. The reaction solution may therefore differ from the etching solution with regard to the nature and amount of the dissolved constituents.

The formation of complexes in the method of the invention prevents the concentration of the free leached constituent, i.e., of the leached constituent not present in the form of a complex, increasing during the etching procedure, without any need for a solvent exchange through effects of diffusion or of convection. Because of the complexing of the leached constituents, therefore, they do not contribute to the corresponding solubility product, and so their solubility overall is increased. As a result, deposits of the leached constituents in the structures formed can be prevented. Furthermore, the leaching process can be accelerated by the shift in equilibrium, so making it possible to prevent a decrease in the etching rate in the course of the structuring process. The complexing of the leached constituents is advantageous in particular in the case of very small structures, for which the small volume means that there is no solvent exchange with the overall volume. In the case of relatively high-viscosity etching solutions as well, in which ion mobility may be additionally restricted by the high viscosity, the complexing of the leached constituents means that there is no decrease in the etching rate as the etching procedure advances. Because of the high hydroxide concentrations, the etching solutions in this case are able to have relatively high viscosities, more particularly in the region of more than 50 Pa*s, and preferably, indeed, of more than 500 Pa*s.

A further advantageous effect lies in the strongly basic environment of the etching solution. As a result of this, the silicate leached out of the glass takes the form of a Lewis base and has a high nucleophilicity. The silicate, accordingly, as a leached constituent, may likewise function as an attacking nucleophile. Because the concentration of silicates increases in the course of the etching procedure, the effects described above are further reinforced, leading to a boost to the etching rate.

In one development of the invention, therefore, the etching solution comprises a silicate in dissolved form, in addition to the complexing agent. In this context, the inventors have surprisingly observed that when etching solutions containing dissolved silicates are used, the etching rate can be increased significantly. This effect is observed in particular at high silicate concentrations in the etching solution. At high silicate concentrations, in particular, the silicates act, moreover, as transferers of alkali and so increase the mobility, or ionic mobility, of the hydroxide ions. This is advantageous in particular for embodiments featuring very high hydroxide concentration in the etching solution. In the case of very concentrated alkali solutions, accordingly, the ionic mobility of the hydroxide ions decreases as the concentration goes up, with consequences for the etching rate as well. By adding silicates as alkali transferers, however, this effect can be at least partly compensated. In one variant of the invention, the etching solution comprises a silicate in dissolved form, alternatively or additionally to the complexing agent.

Even before the etching process, preferably, the etching solution has a silicate concentration of at least 10 mmol/l. In one embodiment, the silicate concentration in the etching solution is 10 to 100 mmol/l. In another embodiment, the etching solution has a silicate concentration in the range from 0.1 to 5 mol/l, preferably in the range from 0.1 to 1 mol/l.

In one embodiment, therefore, the etching solution comprises a silicate, preferably an alkali metal silicate, such as waterglass, for example, in dissolved form. Alternatively or additionally, the silicates may be generated by the dissolving of fused silica or $SiO_2$ as glass constituent in the etching medium.

As a result of the self-reinforcing effect in relation to the etching rate, it is possible with the method of the invention to generate even very small structures which have large cut-end angles. With the method of the invention, accordingly, there is only very little widening of the structures, or none, due to inhibition of the etching procedure within the small, already etched volume.

According to one embodiment, the complexed glass constituents leached from the glass comprise cations. Having emerged as being particularly advantageous is the use of a complexing agent which forms complexes with alkaline earth metal cations, more particularly with calcium ions $(Ca^{2+})$.

Complexing of the leached calcium ions during the etching process is advantageous here not only in relation to the etching rate. During the etching procedure, calcium ions are able here to form calcium silicate $(CaSiO_3)$, which deposits as a precipitate on the glass surface. This is firstly disadvantageous, since it may lead to passivation of the glass surface; secondly, the properties of the glass surface are altered by $CaSiO_3$ coverings. In particular, therefore, the leaching of calcium ions from the glass and their presence in the form of free $Ca^{2+}$ ions are problematic. Glasses with high calcium contents, then, have to date been of only limited suitability for structuring in the basic range, since as a result of the $CaSiO_3$ coverings, defects occurred at the surfaces or in the structures generated, and, moreover, the etching rate was relatively low.

With the method of the invention, in contrast, the leached calcium ions are bound into a complex through the use of a suitable complexing agent, thereby preventing the formation of $CaSiO_3$ coverings on the glass surface. According to one embodiment of the invention, the glass of the glass element therefore has a CaO content of at least 2 wt %. Alternatively or additionally, for the total content of the alkaline earth metal oxides MO and zinc oxide in the glass composition: 4 wt %<$\Sigma$MO+ZnO<15 wt %, preferably 2 wt %<$\Sigma$MO+ZnO<8 wt %. In particular the content $\Sigma$MO+ZnO is >4 wt %, preferably >8 wt %.

Having emerged as being particularly advantageous is the use of complexing agents with phosphorus ligands, from the group, for example, of organic phosphates, more particularly triphenyl phosphate (TPP), or organic phosphonic acids, more particularly aminotrimethylenephosphonic acid (ATMP), since these form particularly stable complexes with calcium ions.

In one embodiment of the invention, the etching solution comprises a chelating agent as complexing agent. By this means it is possible to form particularly stable complexes. Furthermore, complex formation with chelate-forming ligands usually exhibits a higher complexation constant and therefore a higher reaction rate than in the case of complexes with unidentate ligands. According to one particularly advantageous embodiment, the etching solution comprises ethylenediaminetetraacetate (EDTA) as complexing agent. According to a further embodiment, the etching solution comprises salts of hydroxycarboxylic acids, more particularly gluconates, very preferably sodium gluconate.

Alternatively or additionally, the etching solution comprises transition metal hydronium complexes, more particularly hydroxochromates $([Cr(OH)_6]^{3-})$, as complexing agents. Because of the strongly basic pH of the etching solution, hydroxochromates may be obtained here by dissolving chromium(III) salts, for example $CrCl_3$, in the etching medium.

In particular, concentrations of the complexing agent in the etching solution in the range from 0.1 to 550 mmol/l have emerged as being advantageous. According to one embodiment of the invention, the concentration of the complexing agent in the etching solution is 0.1 to mmol/l.

Alternatively or additionally, the etching solution comprises one or more different Lewis bases, which act as alkali donors and/or sequestrants. According to one embodiment, the etching solution contains deconex® FPD 111 from Borer.

In this embodiment, preferably, the etching solution comprises a complexing agent fraction in the range from 0.1 to 5 vol %.

The glass element is preferably in sheet form or in plate form with two opposite side faces. In one embodiment, the glass element here has a thickness of less than 1500 μm. Elevated temperatures during the etching procedure accelerate the etching process here. The etching procedure is therefore performed preferably at temperatures of at least 110° C., more preferably of at least 90° C. Particularly in the case of etching solutions with very high hydroxide concentrations, which have a correspondingly high viscosity, the performance of the etching procedure at elevated temperatures has emerged as being advantageous.

The method has emerged as being particularly advantageous for the etching of soda lime glasses or borosilicate glasses. According to one embodiment, therefore, the glass element provided comprises a soda lime glass or a borosilicate glass.

Particularly good results can be achieved in particular if the glasses of the glass elements provided have only a low fraction of alkaline earth metals. It has emerged as being particularly advantageous to provide glass elements whose glasses have a maximum fraction of the following components in percent by weight:

CaO<8, preferably <5, more preferably <2,
MgO<8, preferably <4,
BaO<8, preferably <5,
SrO<8, preferably <5,
ZnO<6, preferably <2,
$TiO_2$<8, preferably <5 and/or
$Al_2O_3$<20, preferably <7, more preferably <5.

A limited content of $TiO_2$ is advantageous because the leached titanium cation in aqueous solutions forms sparingly soluble compounds, which may form precipitates on the glass element.

In one embodiment, the glass element provided has the following composition in percent by weight:

| | |
|---|---|
| $SiO_2$ | 63-83, |
| $Al_2O_3$ | 0-7, |
| $B_2O_3$ | 5-18, |
| $Li_2O + Na_2O + K_2O$ | 4-14, |
| $MgO + CaO + SrO + BaO + ZnO$ | 0-10, |
| $TiO_2 + ZrO_2$ | 0-3, |
| $P_2O_5$ | 0-2. |

One such glass, for example, is the D263 glass from Schott AG, Mainz.

In an alternative embodiment, a glass element provided has the following glass composition in percent by weight:

| | |
|---|---|
| $SiO_2$ | 50-75, |
| $Al_2O_3$ | 7-25, |

-continued

| | |
|---|---|
| $B_2O_3$ | 0-20, |
| $Li_2O + Na_2O + K_2O$ | 0-0.1, |
| $MgO + CaO + SrO + BaO + ZnO$ | 5-25, |
| $TiO_2 + ZrO_2$ | 0-10, |
| $P_2O_5$ | 0-5. |

One such glass, for example, is the AF32 glass from Schott AG, Mainz.

According to a further embodiment, the glass of the glass element has the following composition in percent by weight:

| | |
|---|---|
| $SiO_2$ | 75-85, |
| $B_2O_3$ | 8-18, |
| $Al_2O_3$ | 0.5-4.5 |
| $Na_2O$ | 1.5-5.5, |
| $K_2O$ | 0-2. |

One such glass, for example, is the Boro 33 glass from Schott AG, Mainz.

It has emerged as being advantageous, furthermore, to use a glass element having the following composition in percent by weight:

| | |
|---|---|
| $SiO_2$ | 55-75, |
| $Na_2O$ | 0-15, |
| $K_2O$ | 2-14, |
| $Al_2O_3$ | 0-15, |
| $MgO$ | 0-4, |
| $CaO$ | 3-12, |
| $BaO$ | 0-15, |
| $ZnO$ | 0-5, |
| $TiO_2$ | 0-2. |

One such glass, for example, is the B270 glass from Schott AG, Mainz.

It has further emerged that it is advantageous to perform the etching process in a stainless steel container or in a container with a corresponding stainless steel lining. Having emerged as being advantageous in this context, in particular, are containers composed of a chromium-containing stainless steel. As a result of the high pH of the etching solution, the surface of the inside of the tank is partially dissolved and the constituents enter the reaction solution. In this case, in turn, in the basic range, it is possible for transition metal complexes such as $[Cr(OH)_6]^{3-}$ to form, which as a ligand complex cations leached from the glass and so contribute to an increase in the etching rate.

The etching procedure may alternatively be performed in an inert container. In this case, PTFE containers or containers with corresponding interior coatings are appropriate. These containers may additionally have steel plates, in the form of disks, for example, which serve as sacrificial plates. These plates are partially dissolved by the alkaline etching solution, and so transition metal complexes are formed here as well. Relative to the use of stainless steel coatings or stainless steel tanks, this variant offers the advantage that the plates are easily replaceable and there is no ablation to the tank itself.

According to one development, the method includes an additional method step, upstream of the etching procedure, in which laser filamentation of the glass element takes place. In this case, by means of a pulsed ultrashort laser, filaments, in the form of fine channels, for example, are generated in the glass element in a targeted way. These channels may either pass completely through the substrate and therefore extend from side face to side face, or may only connect with one of the surfaces of the side face. After the laser filamentation, there is a widening and/or enlargement of the filaments or structures introduced, by means of the etching process of the invention.

BRIEF DESCRIPTION OF FIGURES

The invention is described in more detail below with reference to the figures:

FIG. 3 shows a glass element in which the filamentary indentations are channels, FIG. 4 shows a glass element in which the channels have been enlarged by etching processes, FIG. 5 shows a glass element after removal of a portion, FIGS. 10*a* and 10*b* show photographs of different, structured glass plates which have been treated with different etching solutions.

DETAILED DESCRIPTION

Figure 1:
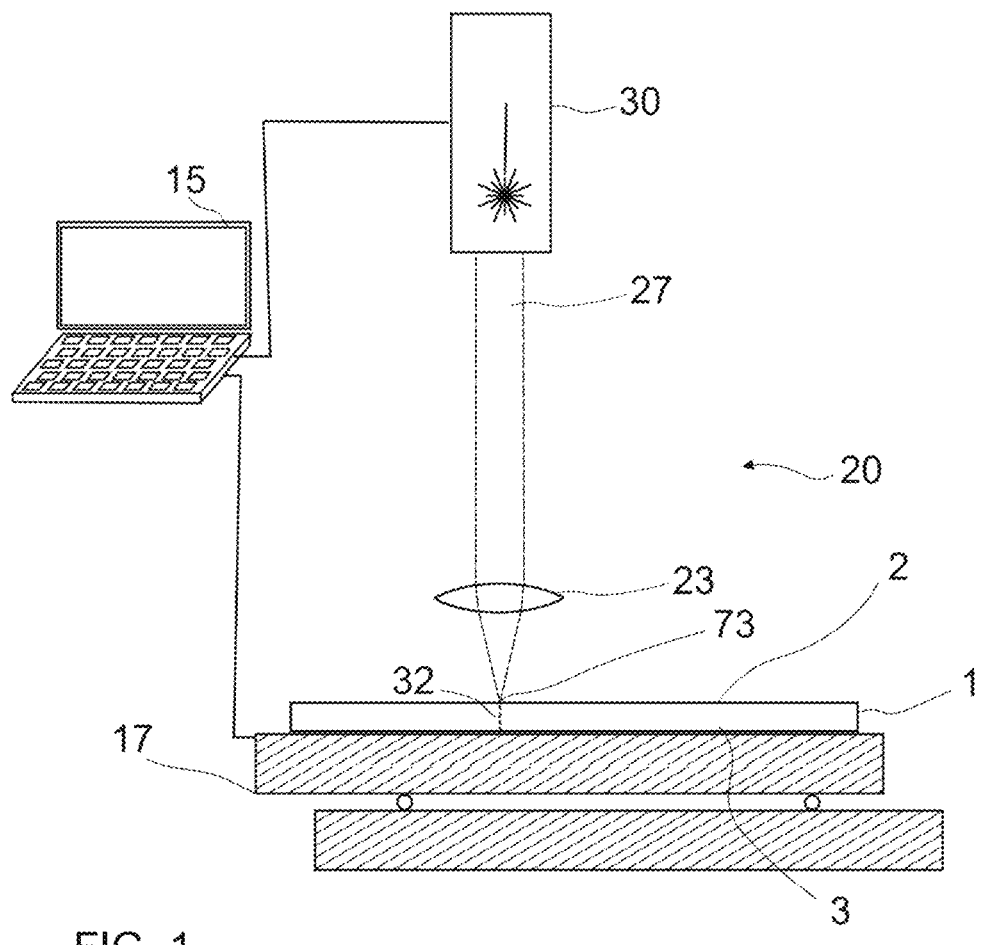
FIG. 1 shows an apparatus for the laser treatment of a glass element in preparation for the subsequent etching method.

FIG. 1 shows an exemplary embodiment of an apparatus 20 which enables filamentary defects 32 to be introduced through laser exposure into the glass element 1. These filamentary defects 32 serve as a starting structure for the generation of channels 5 in the glass element 1 by a subsequent etching process. The apparatus 20 here comprises a pulsed ultrashort laser 30 with a focusing optical system 23 and with an apparatus 17 for positioning the glass element 1. The apparatus 17 for positioning the laser beam 27 enables variable positioning of the laser beam 27 in x and y directions on the side face 2 of the glass element 1. In the exemplary embodiment shown, the positioning apparatus 17 comprises an x-y table, on which the glass element 1 lies by its side face 3. Alternatively, embodiments are also possible wherein the optical elements are in a movable arrangement and therefore allow the laser beam 27 to be moved over a stationary glass element 1.

The apparatus 17 for positioning the glass element 1, and also the laser 27, are preferably controlled via a computer 15. As a result it is possible for the filamentary defects 32 to be generated with lateral structuring on the surface 2 of the glass element.

According to one exemplary embodiment, the parameters which can be used for the laser beam 27 are as follows: the wavelength of the laser beam 27 is 1064 nm, the laser in this case typically being a YAG laser. A laser beam 27 having a diameter of 12 mm is generated, and is subsequently focused using a biconvex lens having a focal length of 16 mm. The pulse time of the laser is less than 20 ps, preferably 10 ps. The pulses are generated in blocks of 2 or more, preferably in blocks of 4 or more pulses. The block frequency is 12 to 48 ns, preferably 20 ns. The pulse energy is at least 200 microjoules, with the block energy correspondingly being at least 400 microjoules.

Following the introduction of one or, preferably two or more filamentary defects 32 into the side face 2 of the glass element 1, the glass element 1 is removed from the apparatus 20 and brought into an alkaline etching solution. Here, in an etching process, material is removed from the defects 32, so that a channel 5 is formed in the place of the respective defect 32.

The etching medium used here is the etching solution of the invention. This is an aqueous alkaline solution having a pH of at least 12, preferably of at least 13 or even 14. According to one embodiment, the etching solution comprises KOH and/or NaOH. The concentration of the hydroxide ions according to one embodiment is 1 to 18 mol/l, preferably 6 to 18 mol/l, more preferably 6 to 12 mol/l. According to one development of this embodiment, the concentration is 1 to 5 mol/l. The etching solution further comprises at least one complexing agent which forms a complex with at least one constituent leached from the glass element 1. In this case, the complexing agent preferably represents one or more ligands of the complex, which forms coordinative bonds with a glass constituent present initially as cation through the etching process.

Figure 2:
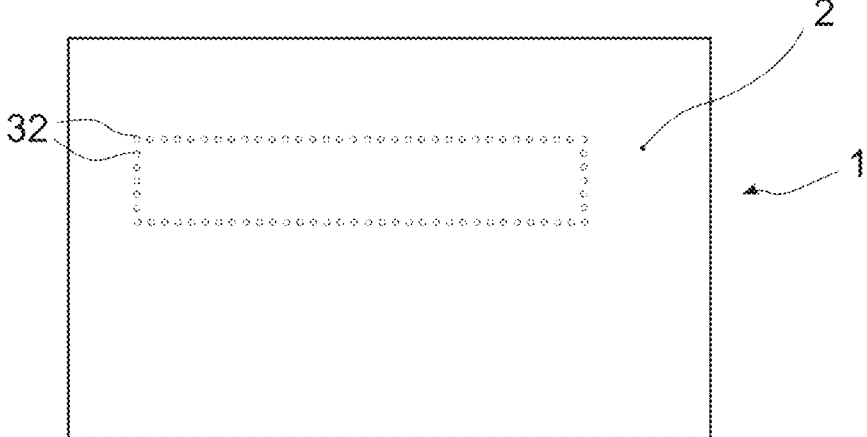
FIG. 2 shows a glass element with filamentary indentations introduced.

FIG. 2 shows the side face 2 of the glass element 1 in plan view. According to the embodiment show in FIG. 2, the glass element 1 on the side face 2 has a multiplicity of filamentary defects 32, which are arranged in a predetermined pattern. These defects 32 may be generated in particular with the apparatus shown in FIG. 1. In the exemplary embodiment shown in FIG. 2, the filamentary defects 32 have been positioned along a path or a line, which describes the contours of a rectangle, on the side face 2 of the glass element 1. Alternatively, the corners of the rectangle may also be rounded. To the skilled person it is apparent that the path or the line on which the defects 32 are positioned may have any desired form.

FIG. 3 represents the glass element 1 shown in FIG. 2, after the subsequent etching process. As a result of the etching process, the filamentary defects 32 have been widened to form channels 5. The channels 5 have a tubular, cylindrical base form or have a tubular configuration. The channels 5 here follow the same line as the filamentary defects before them. The diameter of the channels 5 may be enlarged further by the etching process until the glass between the channels 5 is removed and the individual channels 5 connect with one another.

This is represented in FIG. 4. As a result of the unification of the individual channels 5, an edge 10 is formed in the glass element 1, and the glass element 1 can be separated at this edge. Depending on the distribution pattern of the defects introduced, the edge 10, for example, may also have a circular or round form.

FIG. 5 shows the schematic representation of a glass element 1 in plan view after the removal of a portion along the edge 10 formed by the etching process. As a result of this, the glass element 1 has an opening 13. The form of the opening 13 corresponds to the path or the line on which beforehand the filamentary defects were introduced into the glass by means of laser irradiation.

FIGS. 2 to 5 are examples of one embodiment of the structuring process, in which in a first step the contact point 73 of the laser beam 27 with the glass element 1 is guided along a predetermined path over the side face 2 of the glass element 1, and the resultant filamentary defects 32 are therefore adjacent to one another on the path. In a subsequent step, the filamentary defects are widened by exposing the glass to the etching solution, to form channels 5. The diameter of the channels 5 is increased by further dissolution of the glass by the etching solution until the glass has been removed entirely between the individual channels 5 and the channels 5 are joined to one another. As a result, an edge 10 is formed along the path, and the glass element 1 can be divided at this edge.

Figure 6:
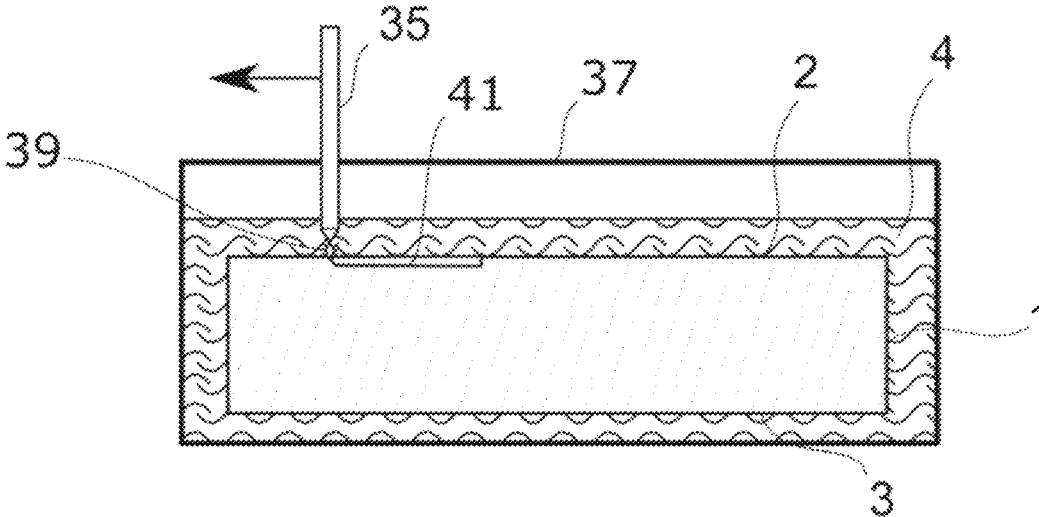
FIG. 6 shows an apparatus for etching the glass.

FIG. 6 shows an embodiment of an apparatus for the locally confined etching of the glass element 1. The container 37 here is filled with the etching solution 4. The electrode 35 is immersed into the container 37 in order to generate a consistent electrostatic discharge in the form of a spark 39. As a result, locally, a cavity is generated in the side face 2 of the glass element 1. It is also possible to use alternative local heating elements rather than the electrode In the correspondingly heated locations of the glass element 1, therefore, the etching process is considerably accelerated, and so by means of a thermal process a precise, locally confined structuring or locally confined working of the glass element 1 is made possible.

FIGS. 7a-7d shows the etching rate in the case of a basic etching procedure as a function of the concentration of the glass already leached in the reaction solution. In this case the glass was etched at 100° C. using a 6 molar KOH solution. The concentration of the leached glass in the reaction solution here is a measure of the progress of the etching process. FIGS. 7a-7d additionally show the effect of different alkaline earth metal ions and also aluminum ions and zinc ions on the etching rate. For this purpose, the respective glass components for study were additized to the etching solution at a concentration of 5 g/l. In the case of the glass A, which serves as a reference in all of FIGS. 7a-d, the glass is a borosilicate glass Boro 33 from Schott.

FIGS. 7a-7d show that in the case of glass A, the etching rate in the course of the etching process initially decreases and increases again at high concentrations of dissolved glass, in other words, here, after progression of the etching process. The decrease in the etching rate at the start of the etching process may be explained by the formation, in the individual filaments, of locally elevated concentrations of the leached constituents, which slow down the etching reaction. Because of the small volumes of the structures, there can be little or no exchange here with the rest of the etching solution. As the etching procedure progresses, the etching rate rises again. At an advanced stage of the etching process, there is a relatively high concentration of dissolved glass and hence also of silicates in the reaction solution. It is assumed that the silicates promote the etching reaction. Hence silicates dissolved in the reaction solution may act as ligands and, through complex formation, lower the concentration of free cations in the reaction solution. A nucleophilic attack of the silicate ions on the glass constituents is a further possibility.

Figure 7A:
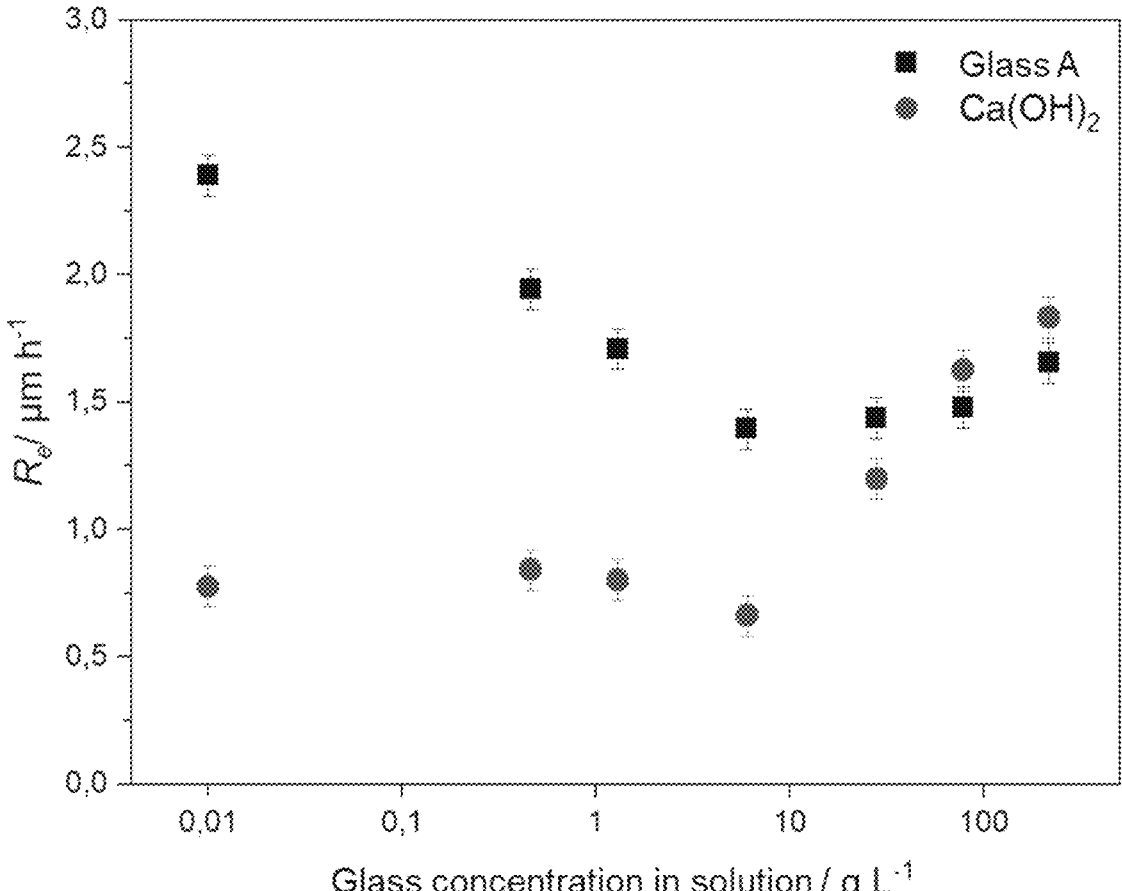
FIGS. 7*a*-7*d* show the effect of different glass constituents on the etching rate.
Figure 7B:
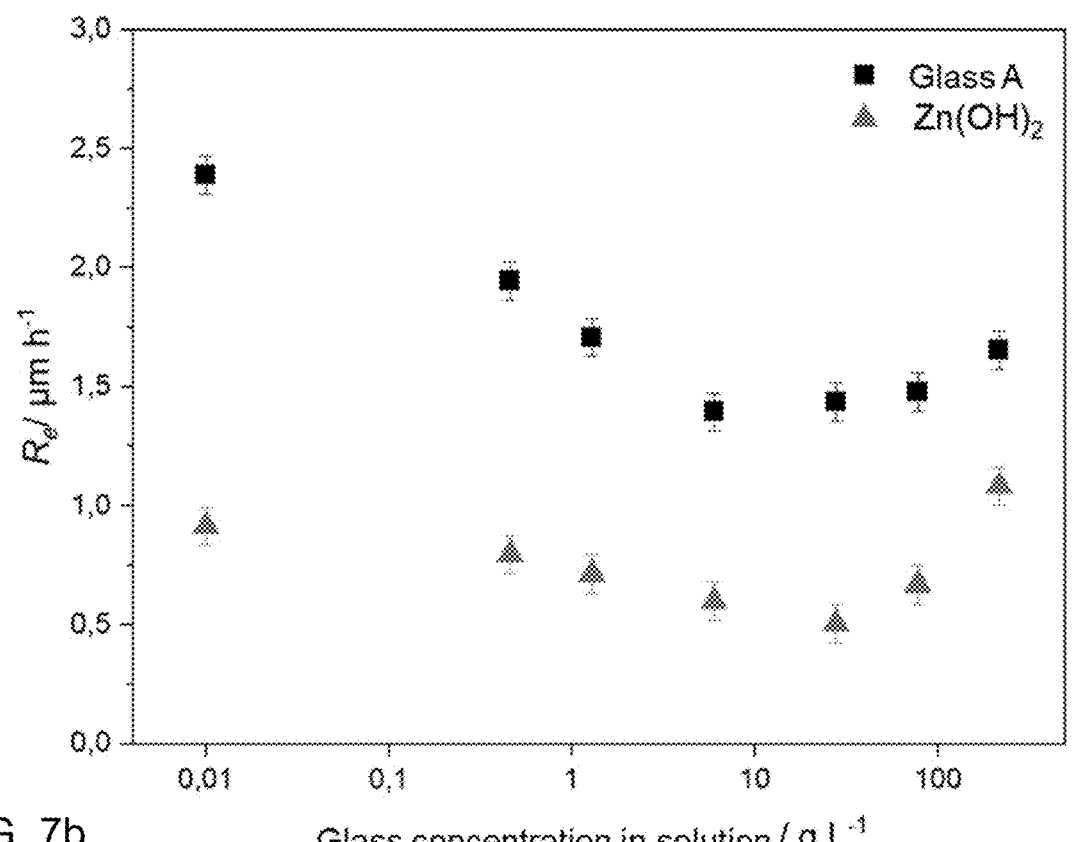
Figure 7C:
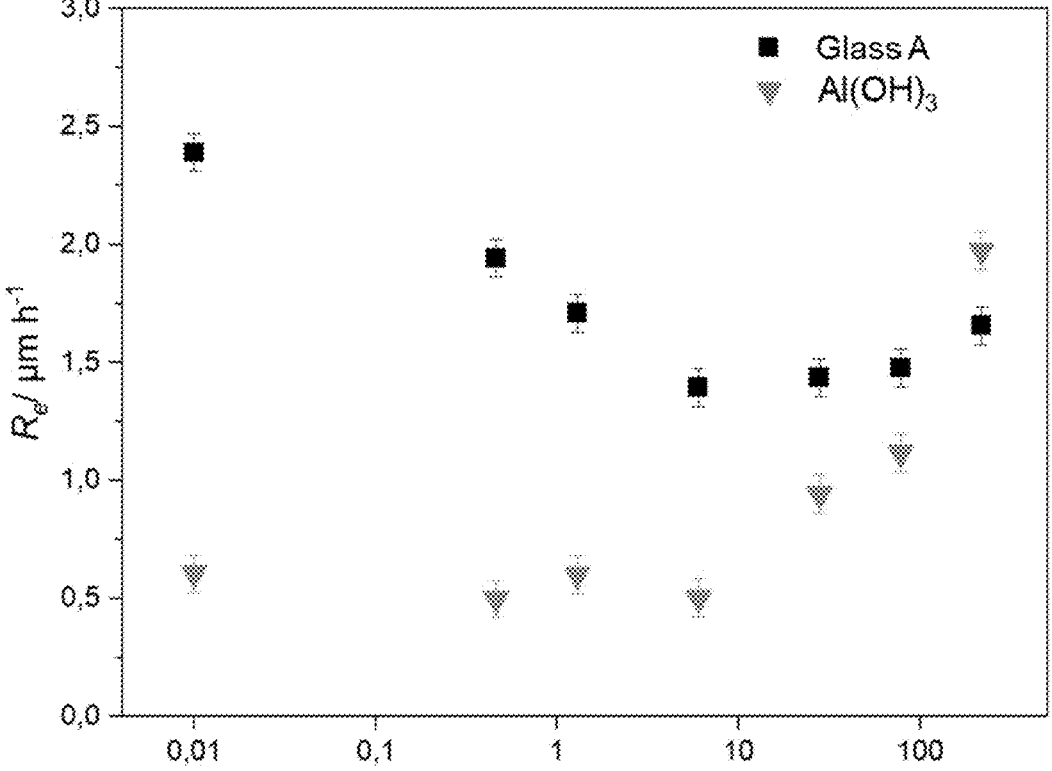
Figure 7D:
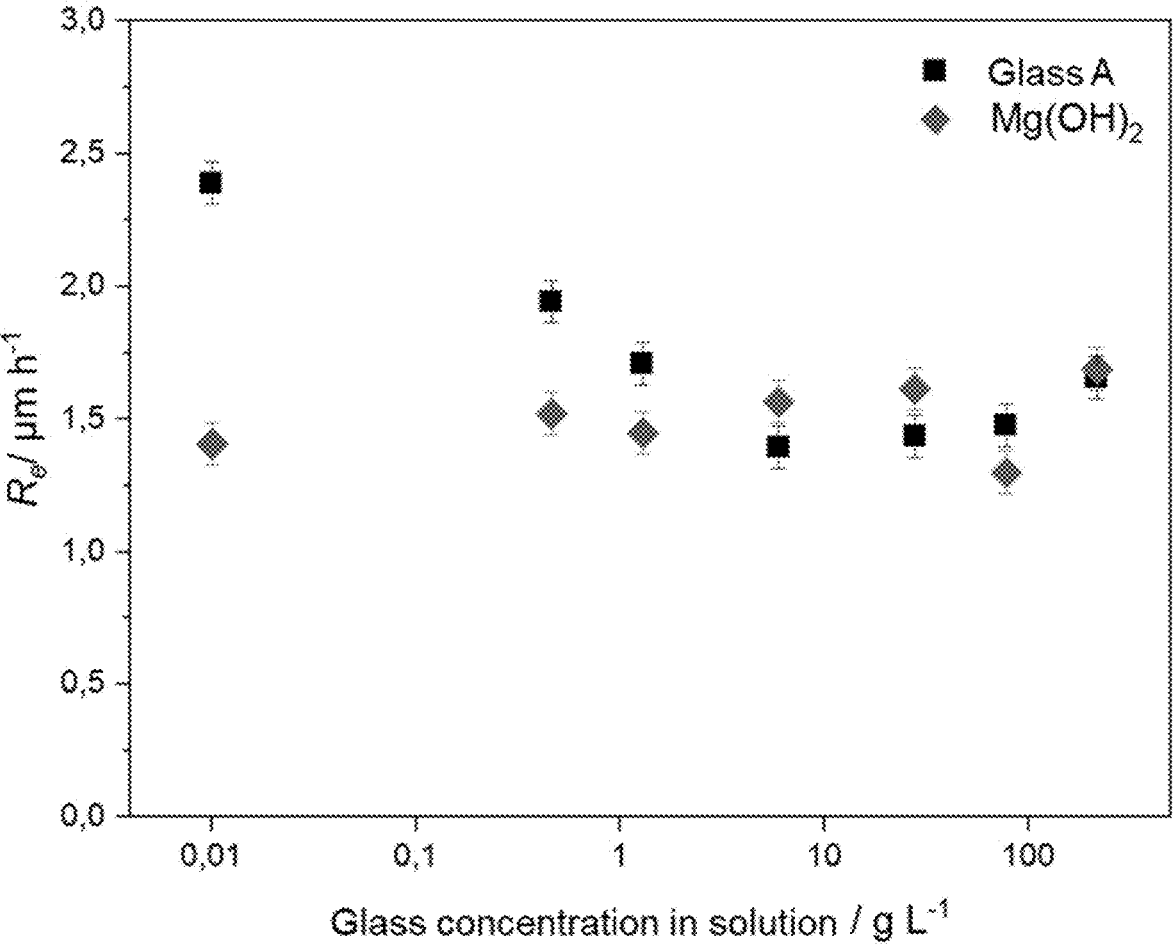

FIG. 7a shows the effect of calcium ions ($Ca^{2+}$) on the etching rate. It is clear that $Ca^{2+}$ ions in the etching/reaction solution greatly decelerate the etching rate. This effect is developed to a particularly high degree at the start of the etching process. There is a similar effect observed on addition of $Zn(OH)_2$ as well (FIG. 7b), $Al(OH)_3$ (FIG. 7c) and $Mg(OH)_2$ (FIG. 7d). Here, it is clear that the glasses used for methods of structuring by means of etching are preferably glasses including a relatively low fraction of alkaline earth metal oxides and/or aluminum oxide.

Figure 8:
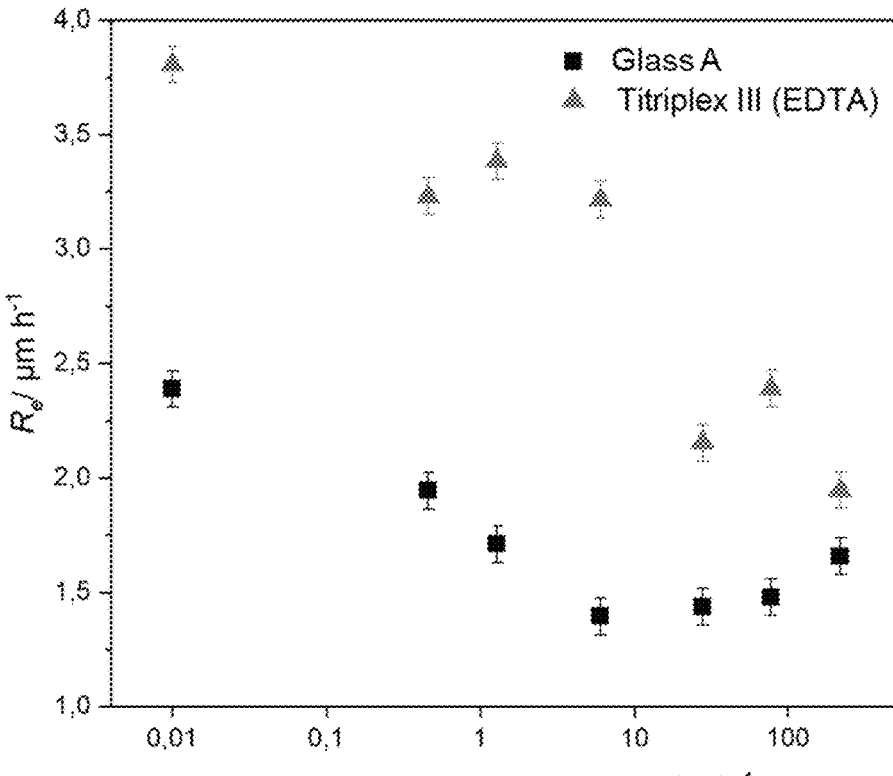
FIG. 8 shows the etching rate of different exemplary embodiments as a function of the concentration of EDTA in the etching solution.

FIG. 8 shows the effect of EDTA (ethylenediaminetetraacetic acid) on the etching rate. The etching rate is shown as a function of the glass concentration in the reaction solution, as a measure of the progress of the etching process. In this case, glass A was brought into contact with an etching solution containing EDTA as complexing agent. The pH of the etching solution was 14 and the concentration of EDTA in the etching solution was 5 g/l. The etching procedure was carried out at a temperature of 100° C. As a reference, a determination was made of the etching rate of the glass A in a corresponding etching solution without EDTA. From FIG. 8 it is apparent that through the addition of EDTA to the etching solution, the etching rate can be boosted considerably. This effect is particularly pronounced after the initial phase of the etching process. Here, the etching rate can be approximately doubled through the addition of EDTA. This effect may be attributed to the complexing activity of EDTA. Hence, particularly with alkaline earth metal cations, EDTA forms complexes which because of the chelate effect exhibit a high stability.

Figure 9:
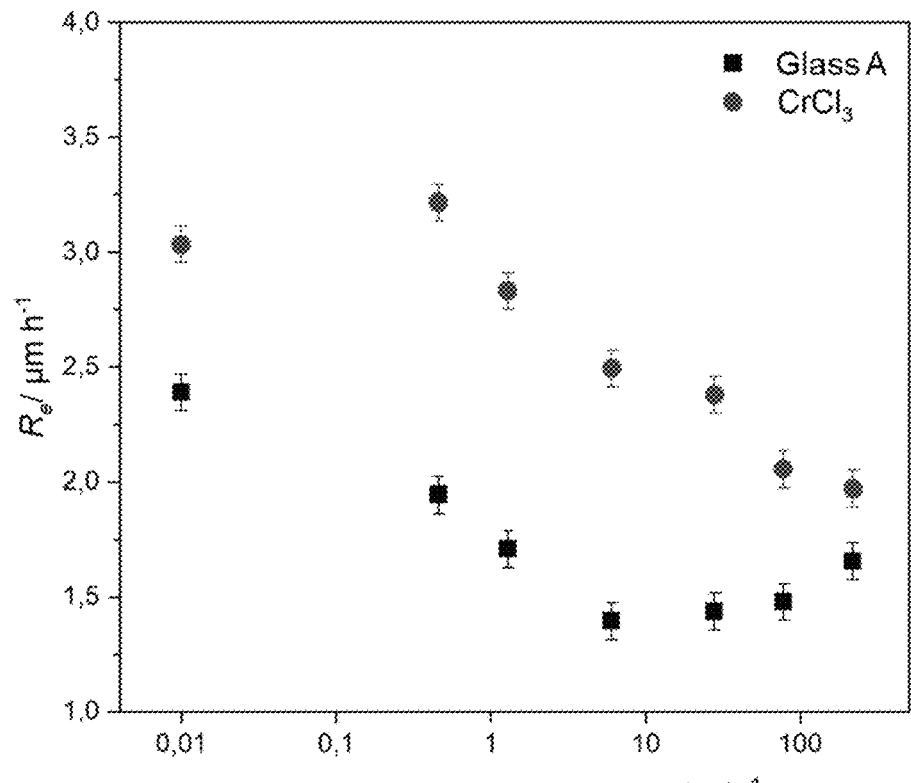
FIG. 9 shows the etching rate of different exemplary embodiments as a function of the concentration of chromium(III) ions in the etching solution.

FIG. 9, in analogy to FIG. 8, shows the effect of chromium(III) ions on the etching rate. In this case the etching solution was admixed with chromium(III) chloride. Because of the high pH of the etching solution, this chloride dissolves to form hydroxochromates ($[Cr(OH)_6]^{3-}$). These function as complexing agents and in this way it is likewise possible to lower the concentrations of free cations leached from the glass.

TABLE 1 below shows the etching rates of different exemplary embodiments and hence the effect of different complexing agents on the etching rate. In each of these cases, borosilicate glass D263 from Schott was treated with an etching solution at a temperature of 100° C. This etching solution contained KOH in a concentration of 6 mol/l. The individual examples differ in terms of the particular complexing agent added. The respective concentrations of the complexing agents are reported in TABLE 1.

TABLE 1

Etching rates in different exemplary embodiments

| Exemplary embodiment | Complexing agent | Concentration of complexing agent | Etching rate [μm/h] |
|---|---|---|---|
| Comparative example | — | — | 0.3 |
| 1 | EDTA | 1 mmol/l | 0.67 |
| 2 | deconex ® FD 111 | 1 vol % | 0.72 |
| 3 | [15]-Crown-5 | 1 mmol/l | 0.59 |
| 4 | Triphosphate | 1 mmol/l | 0.52 |
| 5 | Triphosphate | 10 mmol/l | 0.57 |

From TABLE 1 it is apparent that in all of the exemplary embodiments the etching rate is increased relative to the comparative example. The Deconex® FD111 solution used in exemplary embodiment 2 is a solution of different complexing agents, alkali carriers and sequestrants. Exemplary embodiments 4 and 5 show that the etching rate is dependent only to a certain degree on the concentration of the complexing agent. The etching solutions preferably have a complexing agent concentration in the range from 0.1 to 5.0 mmol/l.

TABLE 2 shows the effect of silicate ions on the etching rate. In each of these cases, a borosilicate glass D263 from Schott was treated with an etching solution at a temperature of 100° C. The etching solutions of comparative example A and also of examples 6 and 7 contain KOH. In comparative example B and also in examples 6 and 7, waterglass was dissolved.

TABLE 2

| | | | Etching rate |
| Exemplary embodiment | c(KOH) | c({K₂SiO₃}) | [μm/h] |
| --- | --- | --- | --- |
| Comparative example A | 6 mol/l | — | 1.12 |
| Comparative example B | — | 200 g/l | 0.70 |
| 6 | 1 mol/l | 200 g/l | 1.18 |
| 7 | 6 mol/l | 200 mg/l | 1.81 |

Effect of the silicate concentration on the etching rate

TABLE 2 shows the effect of the silicate concentration on the etching rate. From comparative example B it is clear that at high silicate concentrations, an etching process is possible even without addition of additional base in the form of KOH. It may be supposed that here the silicate as a Lewis base actively dissolves out glass constituents by means of a nucleophilic attack on the glass. In this case, however, the etching rates are lower than for a KOH-containing etching solution. Examples 6 and 7 as exemplary embodiments of one variant of the invention contain not only KOH but also silicate in the form of dissolved waterglass. It is clear that the etching rate can be boosted considerably through the addition of silicate.

FIGS. 10*a* and 10*b* show photographs of two structured glass articles after an etching time of 48 hours. The glass here in both cases is a borosilicate glass, subjected beforehand to laser filamentation. In terms of their glass composition and also their glass thicknesses, the two glasses match one another. The glass element shown in FIG. 10*a* was treated in an alkaline etching solution with a pH>12 that additionally contains 10 wt % of glass with the same composition. FIG. 10*b* here shows the picture of a glass element treated in an etching solution in analogy to the glass element shown in FIG. 10*a*, with the etching solution here additionally containing 300 mmol/l of sodium gluconate. From FIGS. 10*a* and 10*b* it is clear that through the addition of sodium gluconate to the etching solution, the glass material can be removed far more effectively and more completely from the structures 42 introduced by means of laser filamentation. Hence the glass element shown in FIG. 10*a* has significantly more coverings in the structures, on the surface and also in the structures 42, than the glass element shown in FIG. 10*b*. This effect increases as the dimensions of the structures 42 reduce. Furthermore, the addition of sodium gluconate to the etching solution raises the etching rate. While the etching rate in the etching solution used without sodium gluconate is 0.3 μm/h, this rate can be boosted by addition of sodium gluconate to 0.35 μm/h. Both effects may be attributed here to the complexing activity of the gluconate for alkaline earth metal cations, especially for calcium.

LIST OF REFERENCE SIGNS

Glass element 1
Side faces 2, 3
Etching/reaction solution 4
Channel 5
Edge 10
Opening 13
Computer 15
Positioning apparatus 17

Laser processing apparatus 20
Focusing optical system 23
Laser beam 27
Pulsed ultrashort laser 30
Filamentary defect 32
Locally confined defect 33
Electrode 35
Container 37
Spark 39
Cavity 41
Contact point 73

What is claimed is:

1. A method for producing a glass article, comprising:
etching a glass element to remove glass material from the glass element using an etching medium, the etching medium comprising a basic aqueous etching solution having a pH of more than 12, at least one complexing agent, and silicate in dissolved form, the at least one complexing agent complexing at least one leached constituent of the glass element.

2. The method of claim 1, wherein the pH is more than 14.

3. The method of claim 1, wherein the basic aqueous etching solution comprises potassium hydroxide (KOH) and/or sodium hydroxide (NaOH).

4. The method of claim 3, wherein the basic aqueous etching solution comprises a concentration of hydroxide ions in a range from 1 to 18 mol/l.

5. The method of claim 1, wherein the basic aqueous etching solution comprises a concentration of hydroxide ions in a range from 1 to 18 mol/l.

6. The method of claim 1, wherein the basic aqueous etching solution comprises a concentration of hydroxide ions in a range from 6 to 12 mol/l.

7. The method of claim 1, wherein at least one complexing agent complexes with alkaline earth metal ions and/or calcium ions ($Ca^{2+}$).

8. The method of claim 1, wherein the at least one complexing agent is selected from a group consisting of: phosphates, thymidine triphosphate (TTP), phosphonic acids, salts of hydroxycarboxylic acids, alkali metal gluconates, ethylenediaminetetraacetic acid (EDTA), transition metal salts, and $CrCl_3$.

9. The method of claim 1, wherein the basic aqueous etching solution further comprises a material, in dissolved form, selected from a group consisting of: alkali metal silicate, waterglass, and combinations thereof.

10. The method of claim 1, wherein the at least one complexing agent has a concentration of 0.1 to 550 mmol/l.

11. The method of claim 1, wherein the glass element is a soda lime glass or borosilicate glass.

12. The method of claim 1, wherein the glass material comprises a composition comprising elements selected from a group consisting of: CaO, MgO, ZnO, and any combinations thereof, and wherein the glass material comprises alkaline earth metal oxides MO and ZnO.

13. The method of claim 12, wherein the composition comprises 2 wt %<ΣMO+ZnO<8 wt %.

14. The method of claim 12, wherein the composition comprises CaO of at least 2 wt %.

15. The method of claim 1, wherein the step of etching comprises etching in a stainless steel tank.

* * * * *